United States Patent Office 3,423,265
Patented Jan. 21, 1969

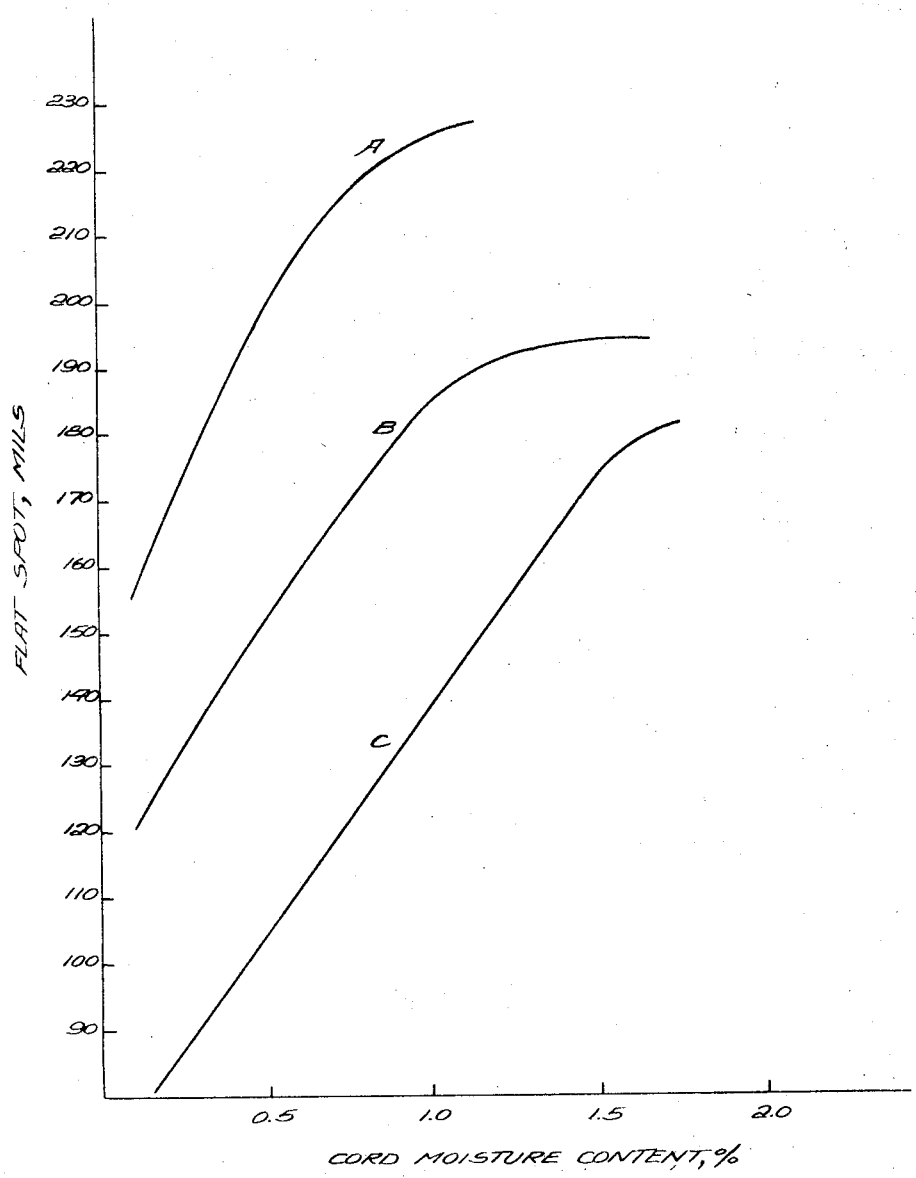

3,423,265
TIRE FABRICATION PROCESS
Lavern James Ahles, Waynesboro, Va., and Yathiraja Iyengar, Newark, Del., assignors to E. I. du Pont de Nemours and Company, Wilmington, Del., a corporation of Delaware
Continuation-in-part of application Ser. No. 363,009, Apr. 27, 1964. This application Mar. 10, 1966, Ser. No. 533,273
U.S. Cl. 156—110    7 Claims
Int. Cl. B29h 17/00

ABSTRACT OF THE DISCLOSURE

Process of making a dry tire reinforced with nylon cords embedded in a skim stock containing a desiccant and having a moisture content less than 0.25%.

---

This is a continuation-in-part directed to subject matter divided from our copending application Ser. No. 363,009 filed Apr. 27, 1964, now U.S. Patent 3,258,049, which was a continuation in part of our since abandoned application Ser. No. 160,287, filed Dec. 18, 1961. The invention relates generally to pneumatic tires and, more particularly, to a nylon-reinforced tire with substantially reduced "flat-spotting" properties.

Nylon tire cords owe their widespread acceptance to the superior service they give under heavy loads, at high speeds, and to their bruise and impact resistance. However, conventionally fabricated tires reinforced with nylon cords often exhibit a temporary phenomenon known as "flat-spotting," i.e., a flatness develops on the tire surface in contact with the road as the tire cools after use. When the tire is again placed in use, this flatness persists temporarily and a thumping sound is audible. This phenomenon has been attributed, at least in part, to such visco-elastic properties as the relatively low dimensional stability, low modulus, and high growth of conventional polyamide yarns.

It has long been recognized that any appreciable reduction in flat-spot depth would remove the principal objection to the otherwise highly advantageous use of nylon in tire reinforcement cords. The present invention is based on the discovery that flat-spotting of a tire having nylon cords is related to the presence of moisture in the cords.

This invention has as its most important objective the provision of a tire reinforced with nylon cords, which cords have an unusually low moisture content. Such a tire has substantially reduced flat-spotting properties.

A further object is to provide moisture barriers surrounding the cords in order to insure that they will remain substantially dry after the tire has been built and placed in use.

A specific objective is to present additional procedures of a detailed nature which should be followed in the preparation and fabrication of such a tire.

These and other objectives are accomplished in a tire having an inner liner and at least one ply of substantially dry, parallelized, nylon reinforcement cords embedded in a skim stock. Such tires are manufactured in a process which includes the steps of dispersing from 3–15% by weight of a desiccant such as calcium oxide in the skim and/or liner stocks, fabricating the ply and liner, building a green tire and curing the green tire in a press. All of the indicated steps are carried out in an atmosphere having a relative humidity of no more than 20% at 75° F.

Where the term "skim stock" is used herein, reference is made to the compounded material used in the preparation of reinforcement plies. Similarly, "liner stock" is the compounded material from which inner liners are fabricated.

For best results, only dry air should be fed to the oven in which the cords are hot-stretched before preparation of the reinforcement fabric. The reinforcement fabric should be kept dry and re-dried if necessary. The skim and tread stock should contain no more than 0.25% moisture and should be kept in a wrapping of polyethylene, cellophane or other moisture-proof material until ready for use. To achieve the maximum benefit from these and other preliminary precautions, the green tire should be built and cured as soon as practicable after preparation of the cord fabric and in an atmosphere having a relative humidity at 75° F. of 20% or less.

In addition to calcium oxide, there are other desiccants which retain moisture at tire operating temperatures and thereby function as a moisture barrier. Typical examples are strontium oxide, activated aluminum oxide, anhydrous magnesium sulfate and specific molecular sieves having a pore size larger than a water molecule. The pore size of such sieves depends on the arrangement of structural units in the sieve crystals.

As an additive or alternative moisture barrier, typical overlays which may be coated on the yarn to exclude moisture are formaldehyde (which cross-links on the filament surface), petroleum waxes, fluorohydrocarbons, vinyl resins, polyvinylidene chloride and acrylonitrile, and silicones such as chlorosilane. Proper precautions should be taken in using hazardous materials such as chlorosilane. These overlays may be applied by dipping, either as a solution or as a melt, during hot-stretching. However, melts should be used only where significant vaporization of the overlay does not occur.

The following examples illustrate some of the practices which may be employed either to remove moisture from, or to establish a moisture barrier for, tire cords made from nylon yarn. Where flat-spot depth is reported, the value is obtained by measuring the unloaded out-of-roundness in mils of a tire heated to 170° F. Then, the heated tire is loaded against a flat surface, with 90% of the maximum permissible load specified in the 1962 Tire and Rim Association (2001 First National Tower, Akron 8, Ohio) Yearbook, and allowed to cool for two hours. The out-of-roundness is measured again and corrected for the over-all shrinkage of the tire. The difference between the two values is flat-spot depth. In actual practice, riding characteristics are acceptable with a flat-spot depth of less than 160 mils.

The preferred tire of this invention is reinforced with cords having a moisture content less than 0.5%. In the appended drawing, the relationship between flat-spot depth and cord moisture content for four-ply pneumatic tires reinforced with cords of 6 Nylon (polycaproamide), 66 Nylon (polyhexamethylene adipamide), and an 80/20 melt blend by weight of polyhexamethylene adipamide with polyhexamethylene isophthalamide (British specification No. 918,637) has been illustrated in graphs A, B and C, respectively. Of the nylon cords comprehended by this invention, the preferred are fabricated from filaments spun from melt blends of polyhexamethylene adipamide (95%–50%) with polyhexamethylene isophthalamide (5–50%), polyhexamethylene 5-t-butyl isophthalamide (5–50%) or a copolymer (5–50%) of hexamethylene 5-t-butyl isophthalamide and hexamethylene isophthalamide (1.5–30%). Other nylon cords which are useful in the practice of this invention (Example IX) include melt blends of the above polyamides with less than an equal amount of one of the polyesters disclosed by Daniels in U.S. Patent 3,051,212.

In the following examples, which are given to illustrate the invention and are not intended to limit the scope in any way, useful tires with two-ply and four-ply constructions are described. Generally, in tires with acceptable flat-spots, a two-ply tire can tolerate a higher moisture content than a four-ply tire.

EXAMPLE I

A four-ply 8.50–14 tire reinforced with cords fabricated from filaments spun from an 80/20 melt blend by weight of polyhexamethylene adipamide with polyhexamethylene isophthalamide is built using desiccated skim and tread stock containing less than 0.25% moisture in which is dispersed a 3:1 suspension of calcium oxide in "Sundex 41," an aromatic processing oil consisting of a blend of high molecular weight petroleum fractions with asphaltum. The skim stock contains 11% by weight and the tread stock 8% by weight of calcium oxide. All stock is calendered at 130° F. Both the materials and the green tire built therefrom are maintained under conditions of approximately 20% relative humidity at 75° F. The test tire is cured conventionally in a vulcanizing press. Its flat-spot depth is 99 mils and, when dissected, the cords are found to contain about 0.4% moisture. A control tire fabricated under similar conditions except for omission of the calcium oxide dispersions exhibits a flat-spot depth of 158 mils, which corresponds to a cord moisture content of about 1.3%. An otherwise identical test tire built from elastomeric skim and tread stock of lower moisture content due to being calendered at approximately 190° F. exhibits a flat-spot depth of only 80 mils, which corresponds to a cord moisture content of only about 0.1%. Thus, it is not only advantageous to incorporate a calcium oxide moisture barrier but also to use dry elastomer stocks.

EXAMPLE II

A tire is built in a 20% relative humidity, 75° F. atmosphere, cured conventionally, and (except that no CaO is in the tread) is structurally identical to the test tire in Example I. This tire exhibits a flat-spot of 93 mils and, when dissected, the cords are found to contain about 0.3% moisture.

Another test tire is built in the same atmosphere and is structurally identical to the test tire in Example I except that 10.2% by weight of CaO is dispersed in the skim stock only, as a powder. This tire has a flat-spot of 99 mils and, when dissected, the cords are found to contain about 0.3% moisture.

From a comparison with Example I, it is apparent that CaO is not required in the tread stock and can be used in either the powdered form or in the form of an oil suspension. Actually, tires with CaO in the tread have been found to have reduced tread durability.

EXAMPLE III

A two-ply 7.50–14 tire reinforced with cords fabricated from filaments spun from an 80/20 melt blend by weight of polyhexamethylene adipamide with polyhexamethylene isophthalamide is built with an inner liner of natural/SBR/reclaimed stock desiccated to less than 0.25% moisture in which is dispersed 12% by weight of powdered calcium oxide. Both the materials and the green tire built therefrom are maintained under conditions of approximately 5% relative humidity at 75° F. The tire is cured conventionally in a vulcanizing press. Its flat-spot depth is 80 mils and, when dissected, the cords are found to contain about 0.4% moisture. This example illustrates the unexpected utility from dispersing the CaO in the inner liner alone where it does not contact the cords at all. Therefore, it may be concluded that CaO in the inner liner acts as a most effective moisture barrier to keep the cords dry.

EXAMPLE IV

Two tubeless four-ply 8.50–14 tires reinforced with cords fabricated from filaments spun from an 80/20 melt blend by weight of polyhexamethylene adipamide with polyhexamethylene isophthalamide are constructed under conditions of 20% relative humidity at 75° F. Both tires are identical and are otherwise processed identically except that, in one instance, "Polymekon" (a wax compound derived from high melting microcrystalline petroleum waxes) is applied as an overlay to the greige cords before the adhesive dip is applied. The moisture content of the cords of the completed tire which is treated with this petroleum wax is 0.5% while the unwaxed cords have a moisture content of 1.0%. Both tires exhibit flat-spot depths of less than 160 mils. To test the effect of the wax overlays, one pint of water is placed inside of each tire. After 0.7 hour exercise at 35 miles per hour, the tires are placed in an oven at 190° F. for two hours. The tire reinforced with treated cords showed no substantial change in flat-spot performance whereas the one with unwaxed cords shows an increase in flat-spot depth of 30 mils. Thus, an effective moisture barrier, such as a petroleum wax applied as an overlay to the greige cords, assures that a tire's acceptable flat-spot capabilities are retained even after service under severe moisture conditions.

EXAMPLE V

A four-ply 8.50–14 tire reinforced with cords fabricated of filaments spun from polyhexamethylene adipamide is built using skim and tread stock desiccated to less than 0.25% moisture in which is dispersed a 3:1 suspension of calcium oxide in "Sundex 41." The skim stock contains 10.1% calcium oxide and the tread stock contains 8.2% calcium oxide. Both the materials and the green tire built therefrom are maintained under conditions of approximately 15% relative humidity at 75° F. The tire is cured in a conventional manner. Its flat-spot depth is 121 mils and, when dissected, the cords are found to contain about 0.1% moisture. A control tire fabricated under similar conditions except for omission of the calcium oxide dispersion exhibits a flat-spot depth of 180 mils.

EXAMPLE VI

A tire is built identical to the test tire of Example V and under similar conditions except that the tire is reinforced with cords fabricated of filaments spun from polycaproamide. This test tire with calcium oxide has a flat spot of 157 mils, and a control tire without calcium oxide has a flat spot of 231 mils.

EXAMPLE VII

A two-ply 7.50–14 tire reinforced with 840/3 cords fabricated from filaments spun from an 80/20 melt blend by weight of polyhexamethylene adipamide with polyhexamethylene 5-t-butyl isophthalamide is built using desiccated skim stock in which is dispersed about 5% by weight calcium oxide suspended in mineral oil ("Caloxol" 31, a 75% CaO dispersion in oil, manufactured by J. & E. Sturge Ltd.). Both the material and the green tire built therefrom are maintained under conditions of less than 5% relative humidity at 75° F. The tire is cured in a conventional manner. Its flat-spot depth is 106 mils and, when dissected, the cords are found to contain about 0.3% moisture. Similar results are achieved in an otherwise identical test tire reinforced with cords prepared from an 80/20 melt blend by weight of polyhexamethylene adipamide with the copolymer of hexamethylene 5-t-butyy isophthalamide and hexamethylene isophthalamide (3%).

EXAMPLE VIII

A four-ply 8.50–14 tire reinforced with cords fabricated of filaments spun from an 80/20 melt blend of polyhexamethylene adipamide and polyhexamethylene isophthalamide is built as is the test tire of Example I except that in place of CaO 15 parts of a molecular sieve (10% by weight) is dispersed in a skim stock of the following composition:

| Components: | Parts by weight |
|---|---|
| Butadiene-styrene rubber (SBR–1006) | 50 |
| Natural rubber | 50 |
| FEF black | 25 |
| Zinc oxide | 3 |
| Stearic acid | 1 |
| "Para-Flux" oil | 5 |
| "Reogen"[1] | 2 |
| "Agerite Resin D" (polymerized trimethyl dihydroquinoline) | 1 |
| Benzothiazole disulfide | 0.25 |
| "NOBS" special (N-oxydiethylene benzothiazole-2-sulfenamide) | 1.25 |
| Sulfur | 2.5 |

[1] Mixture of oil soluble sulfonic acid of high molecular weight with a paraffin oil.

Another exception is that the plies for this test tire are prepared under conditions of 10% relative humidity at 75° F., and the tire is constructed under conditions of 13% relative humidity at 75° F. and then cured at 350° F. As a control, an identical tire is prepared but without adding any desiccant.

Both tires are tested for flat spot and for endurance. Both tires show an inflated tire growth of only 1.6%. Both tires exhibit endurance in the High Speed Endurance Wheel Test to 3,000 miles (without failure) and a contained air temperature of 214° F. The test tire has a flat spot of only 105 mils, while the control tire has a flat spot of 158 mils. This example shows that a molecular sieve effects no change in the durability of a tire, and in fact is even more effective than is CaO in reducing the flat spot of a tire reinforced with cords fabricated from polyamide melt blends.

The molecular sieve used in the test tire is Linde Molecular Sieve 5A derived by cation exchange from Type 4A (Linde Co. Division of Union Carbide Corp., Tonawanda, New York). Molecular Sieve 5A is an alkali metal aluminum silicate of a formula equivalent to

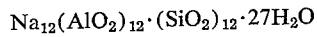

$$Na_{12}(AlO_2)_{12} \cdot (SiO_2)_{12} \cdot 27H_2O$$

Structurally, this molecular sieve consists of three-dimensional $SiO_4$ and $AlO_4$ tetrahedra, the interstices of which contain alkali earth metal and water. The removal of interstitial water results in a network of empty pores and cavities that comprise nearly half the total volume of the crystals. A specific molecular sieve adsorbs only those molecules which are smaller than the sieve pores. Molecular Sieve 5A has a pore size of 5 A. and, therefore, readily adsorbs the water molecule of 3 A. diameter. Another tire, identical to the test tire but with a molecular sieve with a pore size of 8 A., exhibits a flat spot of 129 mils. The less efficient desiccant action of the sieve with 8 A. pores suggests that the larger pores more readily desorb the adsorbed water. Furthermore, the larger pores adsorb some essential accelerator molecules so that rubber curing is impeded.

In the High Speed Endurance Wheel Test, tires are tested at 110% load, 75 miles per hour, for 3,000 miles, or failure, whichever is earlier. The contained air temperature is measured continuously with thermocouples in a slip-ring arrangement. The temperature recorded is that at the end of the test, 3,000 miles, or tire failure, whichever occurs first. A high contained air temperature (such as 225–235° F.) is an indication of poor tire durability.

EXAMPLE IX

A two-ply 7.50–14 tire reinforced with cords from filaments comprising a 30/70 blend by weight of polyethylene terephthalate with polycaproamide is built with an inner liner of desiccated chlorobutyl/natural rubber of the following composition:

| Components: | Parts by weight |
|---|---|
| Chlorobutyl rubber | 90 |
| Natural rubber | 10 |
| MT black | 35 |
| MPC black | 35 |
| "Necton" 60 (plasticizer) | 10 |
| "Staybelite Resin" (hydrogenated rosin; tackifier) | 6 |
| Stearic acid | 2 |
| "Caloxol" 31 (75% CaO dispersion in oil) | 17 |
| Zinc oxide | 5 |
| "Permalux" (di-ortho-tolylguanidine salt of dicatechol borate) | 0.25 |
| Diphenylguanidine | 1 |
| Sulfur | 1 |

Both the materials and the tire built therefrom are maintained below 20% relative humidity at 75° F. The tire is cured in a conventional manner. Its flat spot is 134 mils. A control tire was built in an atmosphere of 50% relative humidity using the chlorobutyl/NR inner liner of the same composition but not containing any CaO/oil dispersion. This tire has a flat spot of 170 mils.

The present invention is directed to the provision of a tire which is reinforced with nylon cords, which tire has acceptable riding characteristics due to its low flat spot of less than 160 mils, and which cords have a moisture content preferably less than 0.5% by weight. In order to ensure this low moisture content, the tire is fabricated in an atmosphere having a relative humidity at 75° F. of 20% or less. It is well known that the air outside of an industrial plant could be below 20% relative humidity (e.g., on a dry winter day), while the relative humidity (in the manufacturing area) could be of the order of 50–80% because of leaky steam pipe connections, open water tanks, and other causes. For the purpose of this invention, the atmosphere having a relative humidity at 75° F. of 20% or less is that within the room in which tire fabrication is carried out. Of the procedures disclosed herein, the dispersion of a desiccant in the elastomer stock is of primary importance since it not only affects the initial flat-spotting behavior of tires but also acts as a moisture barrier when the tires are placed in use. In this respect, additional procedures for establishing such a barrier have also been disclosed.

It is apparent that variations and modifications of the disclosed fabrication procedures may be adopted without departing from the spirit of the present invention which is therefore intended to be limited only by the scope of the appended claims.

Having thus described the invention, what is claimed as new and desired to be secured by Letters Patent is:

1. In the fabrication of a tire reinforced with at least one ply of substantially dry, parallelized, nylon cords embedded in a skim stock, the steps of dispersing from 3–15% by weight of a desiccant in said skim stock; fabricating said ply; building a green tire; and curing said green tire in a press, said dispersing, fabricating and building steps being carried out in an atmosphere having a relative humidity of no more than about 20% at 75° F., said cords consisting essentially of a melt blend of distinct polymers.

2. In the fabrication of a tire having an inner liner and at least one ply of substantially dry, parallelized, nylon reinforcement cords embedded in a skim stock, the steps of: dispersing from 3–15% by weight of a desiccant in said skim stock, said desiccant being selected from the group consisting of calcium oxide, strontium oxide, activated aluminum oxide, anhydrous magnesium sulfate and molecular sieves having a pore size larger than a water molecule; fabricating said ply; building a green tire; and curing said green tire in a press, said dispersing, fabricating and building steps being carried out in an atmosphere having a relative humidity of no more than about 20% at 75° F., said cords consisting essentially of a melt blend of distinct polymers.

3. The process of claim 2 wherein said desiccant is a molecular sieve having a pore size of about 5 A. and said nylon cords consist essentially of a melt blend of distinct polyamides.

4. The process of claim 2 wherein said desiccant is calcium oxide.

5. The process of claim 4 further comprising the preliminary steps of desiccating the inner liner and ply skim stocks to a moisture content of less than 0.25% and dispersing from 3–15% by weight of calcium oxide in the inner liner stock.

6. In the fabrication of a tire having an inner liner and at least one ply of substantially dry, parallelized, nylon reinforcement cords embedded in a skim stock, the steps of: dispersing from 3–15% by weight of a desiccant in the inner liner stock; fabricating the inner liner and ply; building a green tire; and curing said green tire in a press, said dispersing, fabricating and building steps being carried out in an atmosphere having a relative humidity of no more than about 20% at 75° F., said cords consisting essentially of a melt blend of distinct polymers.

7. The process of claim 6 further comprising the preliminary steps of desiccating said inner liner and ply skim stocks to a moisture content of less than 0.25% and dispersing from 3–15% by weight of said desiccant in the ply skim stock, said desiccant being calcium oxide.

References Cited

UNITED STATES PATENTS

| | | | |
|---|---|---|---|
| 2,839,117 | 6/1958 | Clayton | 260—41.5 |
| 2,891,595 | 6/1959 | Kuntz et al. | 161—243 X |
| 2,964,470 | 12/1960 | Wentworth | 156—110 |
| 2,983,705 | 5/1961 | Baldwin | 260—41.5 X |

OTHER REFERENCES

Whitby, G. S.: "Synthetic Rubber," p. 382, Copyright 1954, John Wiley & Sons, New York, N.Y.

Rush, I. C. et al.: Ind. & Eng. Chem., pp. 167–171, January 1949, vol. 41, No. 1.

EARL M. BERGERT, *Primary Examiner.*

C. B. COSBY, *Assistant Examiner.*

U.S. Cl. X.R.

152—330; 156—123, 334; 161—92, 227, 239